(12) United States Patent
Ito et al.

(10) Patent No.: US 11,292,211 B1
(45) Date of Patent: Apr. 5, 2022

(54) ULTRASONIC BONDING APPARATUS

(71) Applicant: KABUSHIKI KAISHA TOSHIBA, Tokyo (JP)

(72) Inventors: Takashi Ito, Fujisawa (JP); Takahiro Aizawa, Yokohama (JP); Masatoshi Tanabe, Yokohama (JP); Haruka Yamamoto, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/351,774

(22) Filed: Jun. 18, 2021

(30) Foreign Application Priority Data

Oct. 6, 2020 (JP) .............................. JP2020-168967

(51) Int. Cl.
*B29C 65/00* (2006.01)
*B29C 65/08* (2006.01)
*H01R 43/02* (2006.01)

(52) U.S. Cl.
CPC ........ *B29C 66/91231* (2013.01); *B29C 65/08* (2013.01); *B29C 66/9241* (2013.01); *B29C 66/9516* (2013.01); *H01R 43/0207* (2013.01)

(58) Field of Classification Search
CPC .............. B29C 65/08; B29C 66/91216; B29C 66/91231; B29C 66/9241; B29C 66/9516; H01R 43/0207
See application file for complete search history.

(56) References Cited

U.S. PATENT DOCUMENTS

2008/0314498 A1* 12/2008 Lee .................. B29O 66/73754
156/64

FOREIGN PATENT DOCUMENTS

| JP | 2006-88607 A | 4/2006 |
| JP | 2008-296161 A | 12/2008 |
| JP | 2018-39041 A | 3/2018 |
| JP | 2018-122347 A | 8/2018 |
| JP | 2018-122348 A | 8/2018 |

\* cited by examiner

*Primary Examiner* — George R Koch
(74) *Attorney, Agent, or Firm* — Oblon, McClelland, Maier & Neustadt, L.L.P.

(57) ABSTRACT

An ultrasonic bonding apparatus includes a temperature sensor that detects a temperature of a bonding target member arranged on an upper side of a stage. The ultrasonic bonding apparatus includes a control device that changes a control parameter associated with the driving of a bonding tool based on information related to the temperature detected by the temperature sensor.

4 Claims, 7 Drawing Sheets

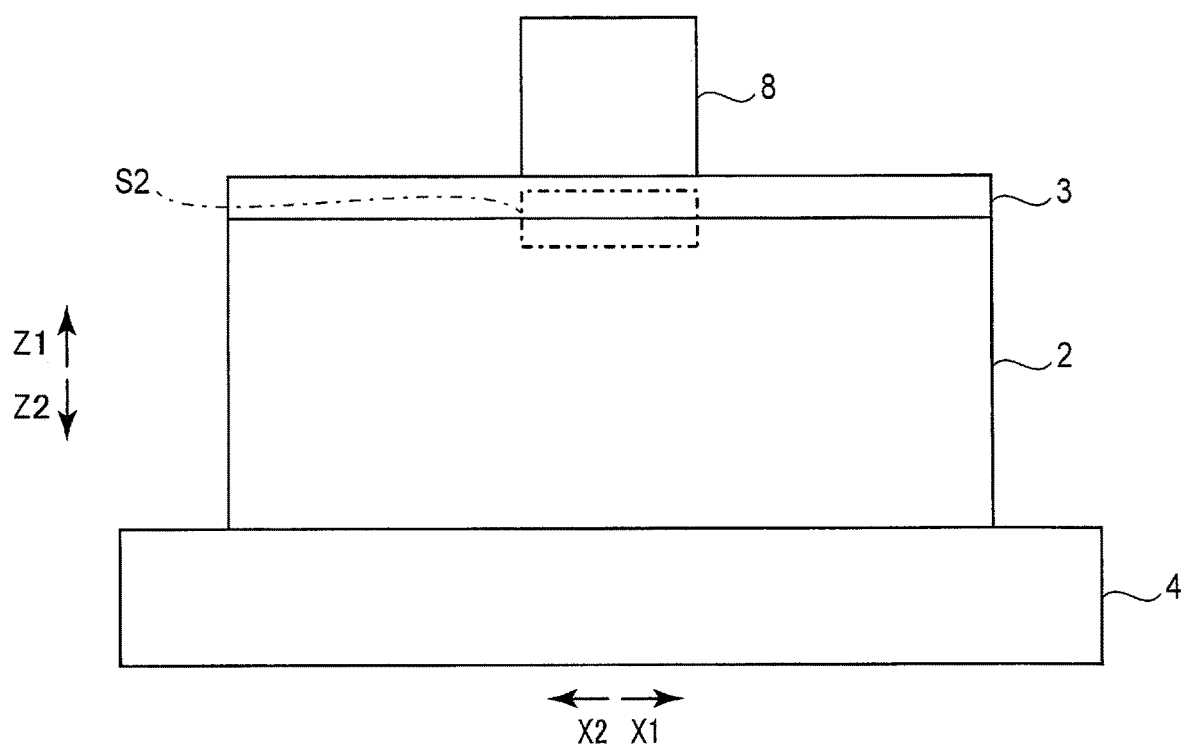
F I G. 4B
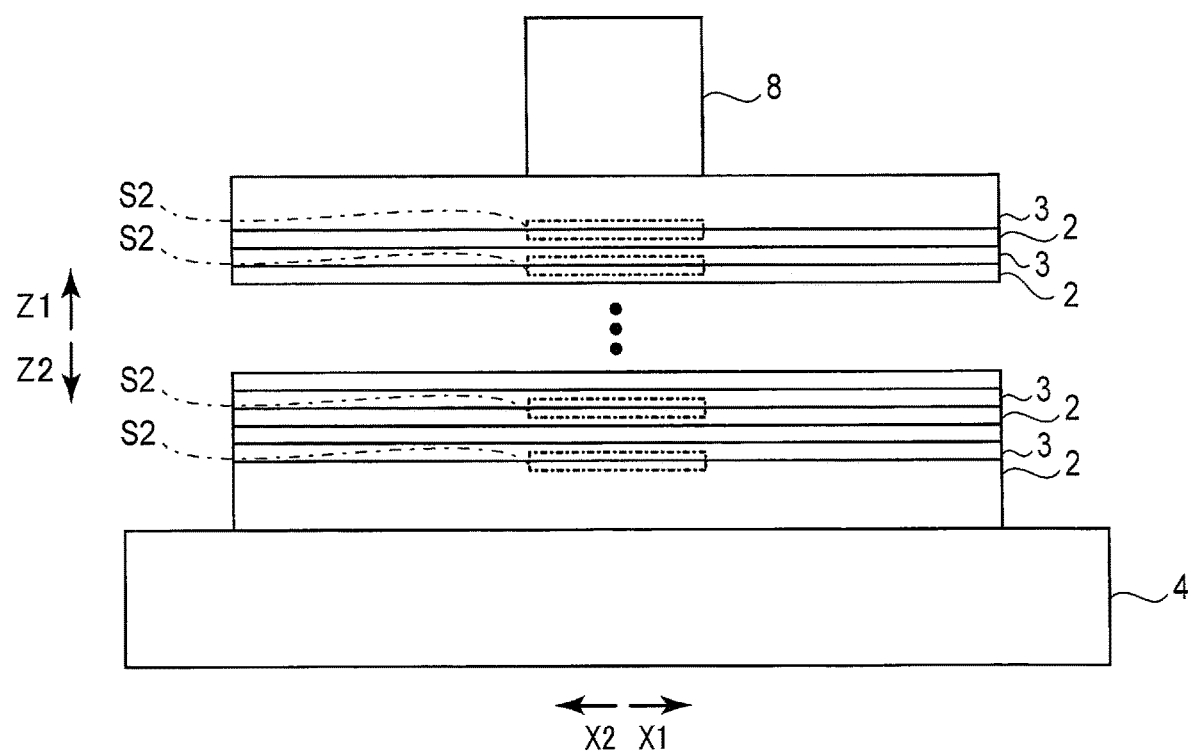
F I G. 4C

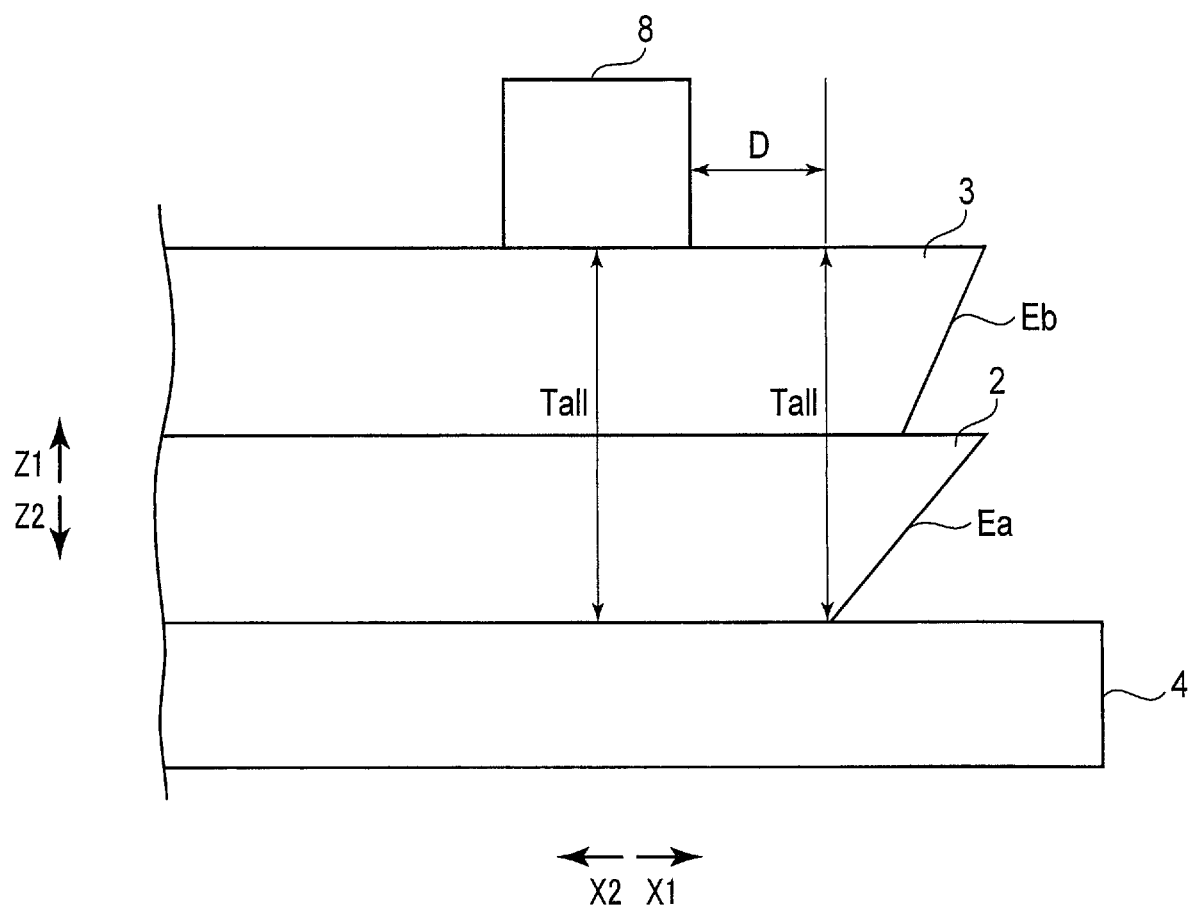
F I G. 5C

ULTRASONIC BONDING APPARATUS

CROSS-REFERENCE TO RELATED APPLICATIONS

This application is based upon and claims the benefit of priority from Japanese Patent Application No. 2020-168967, filed Oct. 6, 2020; the entire contents of which are incorporated herein by reference.

FIELD

Embodiments described herein relate generally to an ultrasonic bonding apparatus.

BACKGROUND

In ultrasonic bonding, a bonding target member is arranged between a stage and a bonding tool, and ultrasonic vibration is transmitted from the bonding tool to the bonding target member in a state where the bonding tool presses the bonding target member, thereby bonding the bonding target member. In an ultrasonic bonding apparatus, an operation thereof is controlled by mainly using any one of a time required for ultrasonic bonding, a position of the bonding tool, energy consumed by an ultrasonic oscillator, and a peak power of the ultrasonic oscillator. In the ultrasonic bonding apparatus, it is required that a decrease in the bonding strength of the bonding target member is suppressed.

BRIEF DESCRIPTION OF THE DRAWINGS

FIG. 4B is a schematic diagram showing, in a case of ultrasonically bonding two bonding target members having different thicknesses in the ultrasonic bonding apparatus according to the embodiment, a range to measure a temperature of the bonding target members.

FIG. 4C is a schematic diagram showing, in a case of ultrasonically bonding three or more bonding target members in the ultrasonic bonding apparatus according to the embodiment, a range to measure a temperature of the bonding target members.

FIG. 5C is a schematic diagram showing bonding target members overlapped in the height direction and whose end shapes are different from those in FIG. 5A, as viewed from a first direction intersecting the height direction in the ultrasonic bonding apparatus according to the embodiment.

DETAILED DESCRIPTION

According to an embodiment, an ultrasonic bonding apparatus includes a stage, a bonding tool, a temperature sensor, and a control device. On an upper side in a height direction of the stage, a bonding target member can be arranged. The bonding tool, arranged above the bonding target member in the height direction, through being driven in a state of using pressurizing force to press the bonding target member downward in the height direction while transmitting ultrasonic vibration which vibrates in a direction intersecting this height direction to the bonding target member, thereby bonds the target member. The temperature sensor detects a temperature of the bonding target member which vibrates by the ultrasonic vibration. The control device changes a control parameter associated with the driving of the bonding tool based on information related to the temperature of the bonding target member detected by the temperature sensor.

Hereinafter, embodiments will be described with reference to the drawings.

First Embodiment

Figure 1:
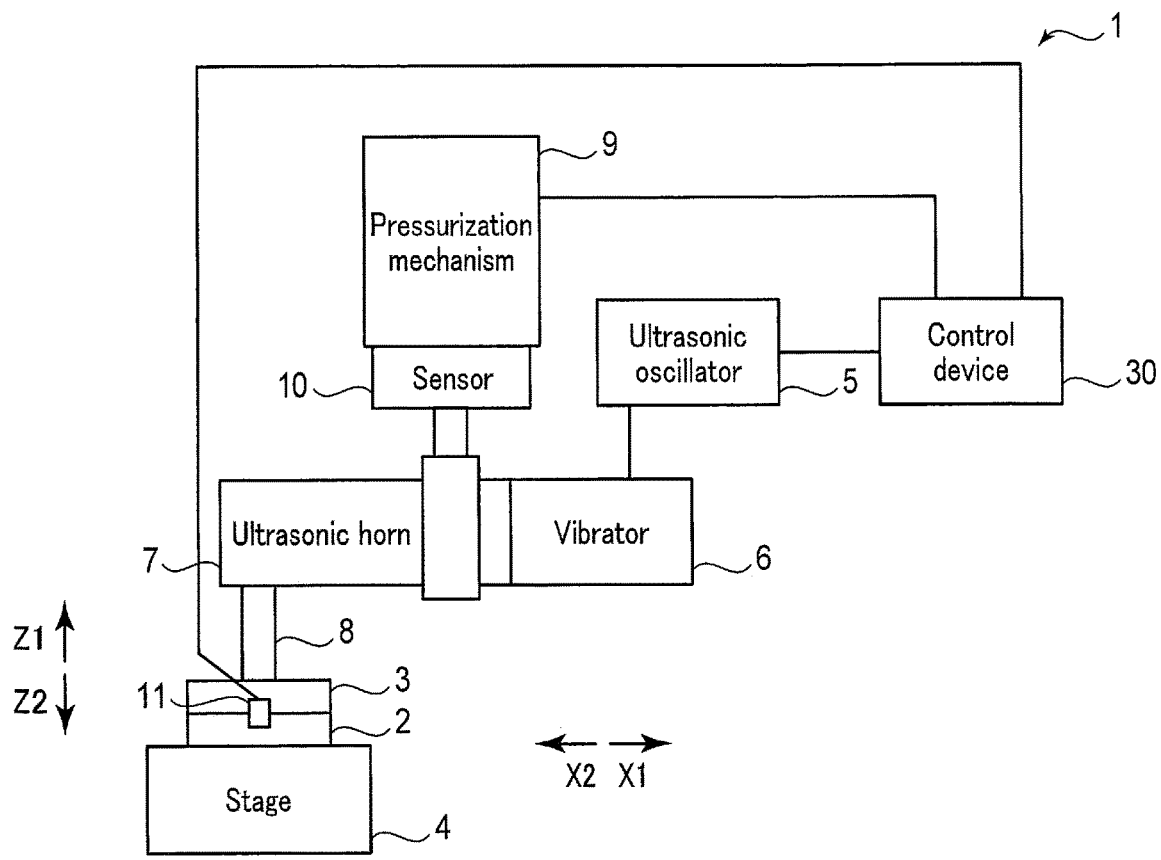
FIG. 1 is a schematic diagram showing an example of an ultrasonic bonding apparatus according to an embodiment.

FIG. 1 shows an example of an ultrasonic bonding apparatus according to an embodiment. As shown in FIG. 1, in an ultrasonic bonding apparatus 1, a height direction (direction indicated by arrows Z1 and Z2), a first direction (direction indicated by arrows X1 and X2) intersecting (perpendicular or approximately perpendicular to) the height direction, and a second direction (direction perpendicular or approximately perpendicular to the paper surface in FIG. 1) intersecting (perpendicular or approximately perpendicular to) both the height direction and the first direction, are defined. In one example, the height direction coincides or approximately coincides with a vertical direction. In this case, the first direction coincides or approximately coincides with a first horizontal direction intersecting (perpendicular or approximately perpendicular to) the vertical direction, and the second direction coincides or approximately coincides with a second horizontal direction intersecting (perpendicular or approximately perpendicular to) both the vertical direction and the first horizontal direction.

In the ultrasonic bonding apparatus 1, bonding target members 2 and 3 can be arranged on an upper surface of a stage 4 in the height direction. The stage 4 supports the bonding target members 2 and 3 from a lower side in the height direction. In a case where the bonding target members 2 and 3 are ultrasonically bonded using the ultrasonic bonding apparatus 1, the bonding target members 2 and 3 are arranged on the upper surface of the stage 4 in a state of overlap. Thus, the bonding target member (a first bonding target member) 2 is arranged adjacent to the bonding target member (a second bonding target member) 3 in the height direction. In addition, the second bonding target member 3 forms a bonding surface with the first bonding target member 2.

An ultrasonic oscillator 5 converts an input electric signal into an electric signal of high frequency (e.g., 20 kHz or 40 kHz) and high voltage (e.g., about 1000 V), and transmits the converted electric signal to a vibrator 6. The vibrator 6 converts the electric signal transmitted from the ultrasonic oscillator 5 into vibration to generate ultrasonic waves. The vibration generated from the vibrator 6 is transmitted to an ultrasonic horn 7. The ultrasonic horn 7 transmits the ultrasonic vibration transmitted from the vibrator 6 to a bonding tool 8. The bonding tool 8 transmits the ultrasonic vibration transmitted from the ultrasonic horn 7 to the bonding target members 2 and 3. In the present embodiment, the bonding tool 8 vibrates in the second direction. A pressurization mechanism 9 applies pressurizing force to the ultrasonic horn 7 and the bonding tool 8 to press the bonding tool 8 against the bonding target members 2 and 3. Thereby, the bonding target members 2 and 3 vibrate in the second direction and are bonded. In this way, in a case where the bonding target members 2 and 3 are ultrasonically bonded using the ultrasonic bonding apparatus 1, the bonding tool 8 transmits ultrasonic vibration to the bonding target members 2 and 3 in addition to pressing the bonding target member 3 against the bonding target member 2 via the pressurizing force of the pressurization mechanism 9. The bonding target members 2 and 3 are thereby ultrasonically bonded. In one example, a lead and a current collector of a battery are bonded using the ultrasonic bonding apparatus 1.

A vibration transmission direction from the bonding tool 8 to the bonding target members 2 and 3 is perpendicular or approximately perpendicular to a vibration direction of the bonding tool 8. That is, the vibration transmitted by the bonding tool 8 to the bonding target members 2 and 3 is a lateral vibration. With the configuration as described above, the bonding tool 8 is driven in a state of using pressurizing force to press the bonding target members 2 and 3 downward in the height direction and transmitting ultrasonic vibration which vibrates in the second direction, intersecting the height direction, to the bonding target members 2 and 3. Then, when the bonding tool 8 is driven, the bonding target members 2 and 3 are bonded.

A control device 30 controls the ultrasonic oscillator 5 and the pressurization mechanism 9. In addition, a sensor 10 and a temperature sensor 11 are connected to the control device 30. In the present embodiment, the sensor 10 measures pressurizing force applied to the ultrasonic horn 7 and the bonding tool 8 from the pressurization mechanism 9 and a position of the bonding tool 8 in the height direction as measurement parameters. The position in the height direction may be, for example, an absolute position of the bonding tool 8 in the height direction or a relative position of the bonding tool 8 in the height direction with a certain position in the height direction as a reference. In the present embodiment, the temperature sensor 11 measures a temperature (surface temperature) of surfaces of the bonding target members 2 and 3 as information associated with the bonding target members. In the sensor 10 and the temperature sensor 11, the above-described measurement parameters are detected periodically at a predetermined timing. The temperature sensor 11 may be a contact type sensor (a contact sensor) or a noncontact type sensor (a noncontact sensor). An example of a contact sensor is a thermocouple. Examples of a noncontact sensor include a thermocamera and a radiation thermometer.

Each of the vibrator 6, the ultrasonic horn 7, and the bonding tool 8 may be formed separately; the vibrator 6 and the ultrasonic horn 7 may be formed integrally; or the ultrasonic horn 7 and the bonding tool 8 may be formed integrally. In addition, each of the vibrator 6, the ultrasonic horn 7, and the bonding tool 8 may be formed integrally.

In the ultrasonic bonding apparatus 1 of the present embodiment, a user interface may be provided. The user interface includes an operating member. In the operating member, an instruction associated with operations of the ultrasonic bonding apparatus 1 is input by an operator, etc. Examples of the operating member include a button, dial, a display, and a touch panel. In addition, the user interface may include a notification part that notifies information to the operator, etc. The notification part performs notification by means of a screen display, issuing of sound, lighting-up of a light, etc. In the notification part, for example, information necessary for recognition by the operator, warning information for the operator, etc. are notified.

Figure 2:
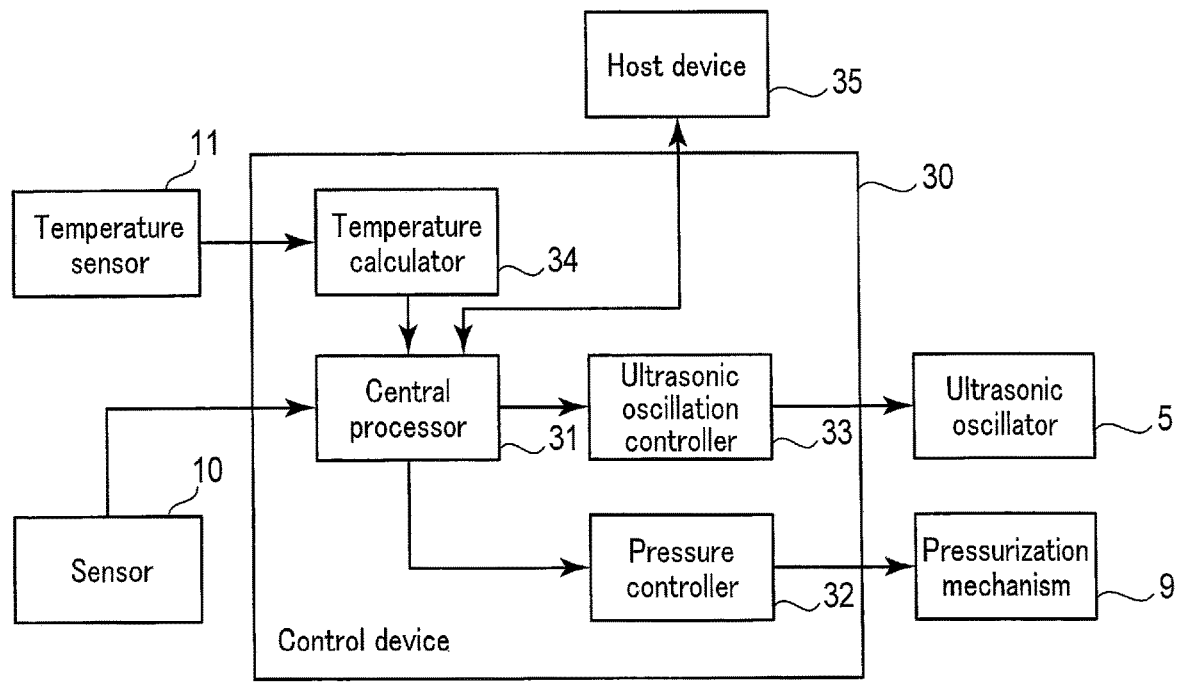
FIG. 2 is a block diagram schematically showing an example of the ultrasonic bonding apparatus according to the embodiment.

FIG. 2 shows an example of a block diagram of the control device 30. The control device 30 is, for example, computer. The control device 30 includes a processor or an integrated circuit (control circuit) including a central processing unit (CPU), an application specific integrated circuit (ASIC), or a field programmable gate array (FPGA), and a storage medium such as a memory. The control device 30 may include one processor or integrated circuit, or a plurality of processors or integrated circuits. The control device 30 performs processing by executing a program, etc. stored in the storage medium, etc.

The control device 30 includes a central processor 31, a pressure controller 32, an ultrasonic oscillation controller 33, and a temperature calculator 34. The central processor 31 manages the control device 30. The pressure controller 32 controls the pressurization mechanism 9 to adjust a magnitude of pressurizing force applied from the pressurization mechanism 9 to the bonding target members 2 and 3. The ultrasonic oscillation controller 33 controls ultrasonic oscillation of the ultrasonic oscillator 5. The temperature calculator 34 calculates temperatures of the bonding target members 2 and 3 based on a measurement value of the temperature sensor 11. The central processor 31 acquires a load applied by the pressurization mechanism 9 from the sensor 10 and a position of the bonding tool 8 in the height direction. The central processor 31 can control the pressurization mechanism 9 and the ultrasonic oscillator 5 via the pressure controller 32 and the ultrasonic oscillation controller 33 based on information acquired from the sensor 10 and the temperature calculator 34. In addition, the central processor 31 can communicate with an external host device 35. The central processor 31 can receive a control instruction from the host device 35. The central processor 31 can transmit information related to the ultrasonic bonding apparatus 1 to the host device 35 based on a request from the external host device 35. The host device 35 is, for example, a manufacturing execution system (MES) or a programmable logic controller (PLC).

In the above-described ultrasonic bonding apparatus 1, the bonding tool 8 vibrates in the second direction. Through being pressed by the bonding tool 8, the bonding target members 2 and 3 vibrate in the second direction and are pressed against each other, thereby ultrasonically bonded. In this case, in the bonding target members 2 and 3, a temperature near a bonding surface between the bonding target members 2 and 3 rises sharply with the start of ultrasonic bonding. When the temperature near the bonding surface is higher than a predetermined temperature, the bonding target members 2 and 3 are satisfactorily bonded. Thus, in the ultrasonic bonding apparatus 1, it is important to measure the temperature near the bonding surface of the bonding target members 2 and 3 at the time of ultrasonic bonding.

Further, it is desirable that the temperature is measured at the nearest possible position to the bonding surface. As a result, a temperature change is measured in real time as much as possible without delaying an actual temperature change of the bonding surface. In the present embodiment, the control device 30 controls the ultrasonic oscillator 5 and the pressurization mechanism 9 based at least on a measurement value of the temperature sensor 11 to perform ultrasonic bonding of the bonding target members 2 and 3. Thus, in the ultrasonic bonding apparatus 1 of the present embodiment, a decrease in the bonding strength of the bonding target members 2 and 3 can be suppressed.

When the control device 30 controls the ultrasonic oscillator 5 and the pressurization mechanism 9, the ultrasonic bonding apparatus 1 ultrasonically bonds the bonding target members 2 and 3, and the sensor 10 and the temperature sensor 11 detect the above-described measurement parameters (pressurizing force, a position in the height direction, and a temperature). Then, the control device 30 acquires measurement values of the measurement parameters at the sensor 10 and the temperature sensor 11. Thus, the measurement parameters are acquired by the control device 30. The control device 30 acquires the measurement values of the measurement parameters periodically at a predetermined timing. Thus, the control device 30 also acquires a temporal change (temporal history) of the measurement parameters, in addition to the measurement values of the measurement parameters associated with the ultrasonic bonding apparatus 1, as measurement data. Accordingly, the measurement data acquired by the control device 30 includes a temporal change (temporal history) of the pressurizing force of the pressurization mechanism 9, a temporal change (temporal history) of the position of the bonding tool 8 in the height direction, and a temporal change (temporal history) of the temperatures of the bonding target members 2 and 3, etc.

Figure 3:
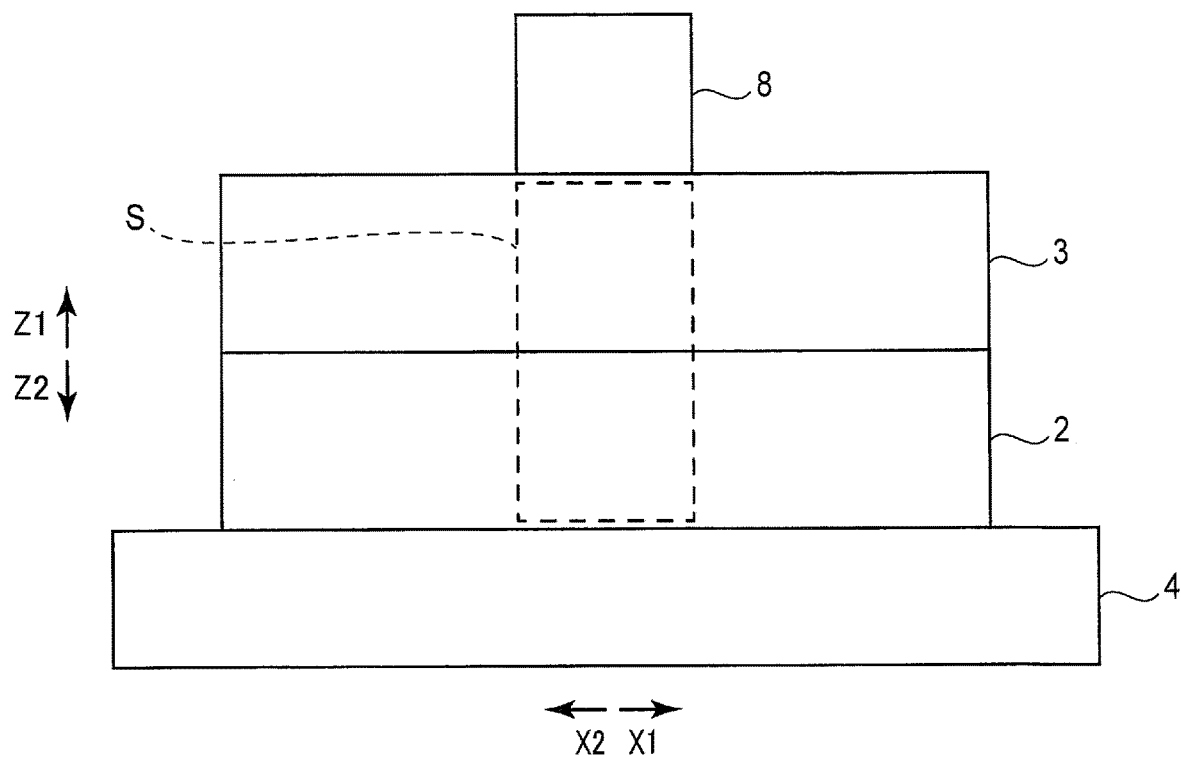
FIG. 3 is a schematic diagram showing a range to measure a temperature of bonding target members in a case of ultrasonically bonding the bonding target members in the ultrasonic bonding apparatus according to the embodiment.

Herein, a range for temperature measurement near the bonding surface of the bonding target members 2 and 3 will be described. FIG. 3 shows a measurement range S of a temperature that can be measured as a temperature near the bonding surface of the bonding target members 2 and 3 in a case of ultrasonically bonding the bonding target members 2 and 3. FIG. 3 shows the bonding target members 2 and 3 as viewed from the second direction. As described above, the bonding surface of the bonding target members 2 and 3 is a portion where the bonding target members 2 and 3 contact each other in the height direction, i.e., a portion where an upper surface of the first bonding target member 2 and a lower surface of the second bonding target member 3 contact each other. The temperature sensor 11 measures a surface temperature of the bonding target members 2 and 3 at a position close to the bonding surface of the bonding target members 2 and 3 as a temperature near the bonding surface of the bonding target members 2 and 3.

In the present embodiment, the temperature sensor 11 measures a temperature of edge portions in the second direction in the bonding target members 2 and 3 in a state where the bonding target members 2 and 3 are installed on the upper surface of the stage 4, as shown in FIG. 3, as the temperature near the bonding surface of the bonding target members 2 and 3. In one example, the temperature sensor 11 measures temperatures of an edge portion of a main surface facing the height direction of the first bonding target member 2 and an edge portion of a main surface facing the height direction of the second bonding target member 3. The temperature measurement range S is either not displaced or virtually un-displaced with respect to the bonding tool 8 in the first direction in the bonding target members 2 and 3. A size of the temperature measurement range S in the first direction coincides or approximately coincides with a dimension of the bonding tool 8 in the first direction. A size of the temperature measurement range S in the height direction coincides or approximately coincides with a thickness (total thickness) obtained by summing thicknesses of the bonding target members 2 and 3. A measurement portion of the temperature sensor 11 is not limited as long as it is within the temperature measurement range S. The temperature sensor 11 may measure temperatures of a plurality of portions within the temperature measurement range S.

Figure 4A:
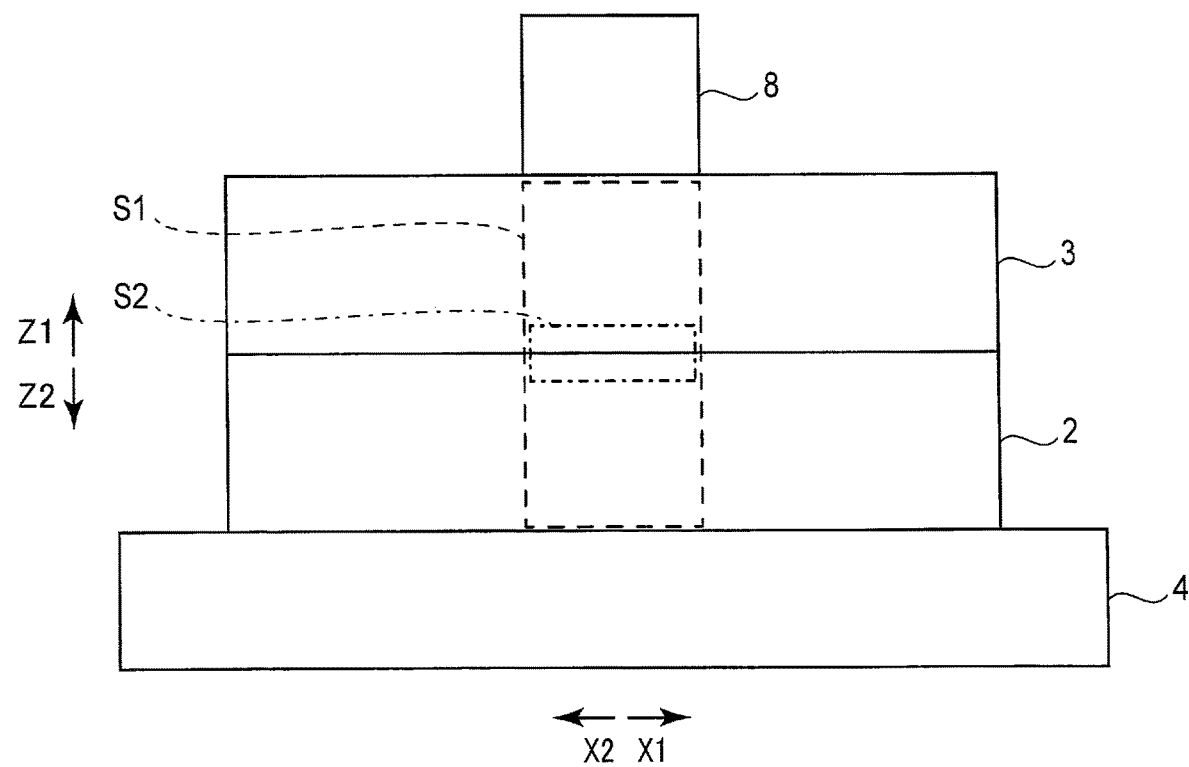
FIG. 4A is a schematic diagram showing, in a case of ultrasonically bonding two bonding target members having approximately the same thickness in the ultrasonic bonding apparatus according to the embodiment, a range to measure a temperature of the bonding target members.

FIG. 4A shows an example of a range that can be measured as a temperature near a bonding surface in a case of ultrasonically bonding two bonding target members having approximately the same thickness. Also in the example of FIG. 4A, measurement ranges S1 and S2 are either not displaced or virtually un-displaced with respect to the bonding tool 8 in the first direction as described above. In this case, a measurement range of a temperature may be either the measurement range S1 or the measurement range S2. The temperature measurement range S1 is similar to the temperature measurement range S of the example of FIG. 3. That is, a size of the temperature measurement range S1 in the first direction coincides or approximately coincides with a dimension of the bonding tool 8 in the first direction. A size of the temperature measurement range S1 in the height direction coincides or approximately coincides with the total thickness of the bonding target members 2 and 3.

The temperature measurement range S2 is a measurement range for measuring a position closer to the bonding surface of the bonding target members 2 and 3 as compared with the temperature measurement range S1. That is, in the height direction, a size of the temperature measurement range S2 is smaller than that of the temperature measurement range S1. A size of the temperature measurement range S2 in the first direction coincides or approximately coincides with the dimension of the bonding tool 8 in the first direction. The size of the temperature measurement range S2 in the height direction is appropriately set according to a combination of the bonding target members 2 and 3, etc. In one example, the size of the temperature measurement range S2 in the height direction coincides or approximately coincides with a size from a position where the thickness of the bonding target member 2 is half or approximately half to a position where the thickness of the bonding target member 3 is half or approximately half. In a case where a dimension of each of the bonding target members 2 and 3 in the height direction is large to a certain extent, the measurement range is preferably the measurement range S2. This is because inclusion in the measurement range of a portion away from the bonding surface of the bonding target members 2 and 3 in the height direction renders it difficult to measure the temperature near the bonding surface of the bonding target members 2 and 3 as a measurement parameter. In other words, in such a case, when using the measurement range S1 as the measurement range, the possibility of a temperature significantly different from an actual temperature of the bonding surface of the bonding target members 2 and 3 being measured as a measurement parameter is high.

FIG. 4B shows an example of a range that can be measured as a temperature near the bonding surface in a case of ultrasonically bonding two bonding target members having different thicknesses. Also in the example of FIG. 4B, a temperature measurement range is either not displaced or virtually un-displaced with respect to the bonding tool 8 in the first direction as described above. In this case, the temperature measurement range is a range corresponding to the temperature measurement range S2 in the example of FIG. 4A. This is because when the measurement range S1 in the example of FIG. 4A is measured in the example of FIG. 4B, the possibility of a temperature significantly different from an actual temperature of the bonding surface of the bonding target members 2 and 3 being measured as a measurement parameter is high due to the large difference in thickness of the bonding target members 2 and 3. In one example, a size of the temperature measurement range S2 in the height direction coincides or approximately coincides with the thickness of the thinner bonding target member. In this example, the temperature measurement range S2 is set such that the bonding surface is at the middle or approximately at the middle of the height direction of the temperature measurement range S2.

FIG. 4C shows an example of a range that can be measured as a temperature near a bonding surface in a case of ultrasonically bonding three or more bonding target members. Also in the example of FIG. 4C, a temperature measurement range is either not displaced or virtually undisplaced with respect to the bonding tool 8 in the first direction as described above. The temperature measurement range is the temperature measurement range S2, a position close to the bonding surface of the bonding target members 2 and 3 adjacent in the height direction. In the example of FIG. 4C, since three or more bonding target members are ultrasonically bonded, there are a plurality of measurement ranges S2. In this case, a range measured by the temperature sensor 11 may be one measurement range S2 or a plurality of measurement ranges S2. This measurement range S2 can be set appropriately according to a combination of a plurality of bonding target members, etc. In one example, of a plurality of temperature measurement ranges S2, a temperature measurement range S2 including a bonding surface assumed to have the highest vulnerability may be set as the measurement range. In another example, one or more temperature measurement ranges S2 may be set as the measurement ranges by assuming strength and/or electrical characteristics of the bonding target members after ultrasonic bonding from a plurality of temperature measurement ranges S2.

Figure 5A:
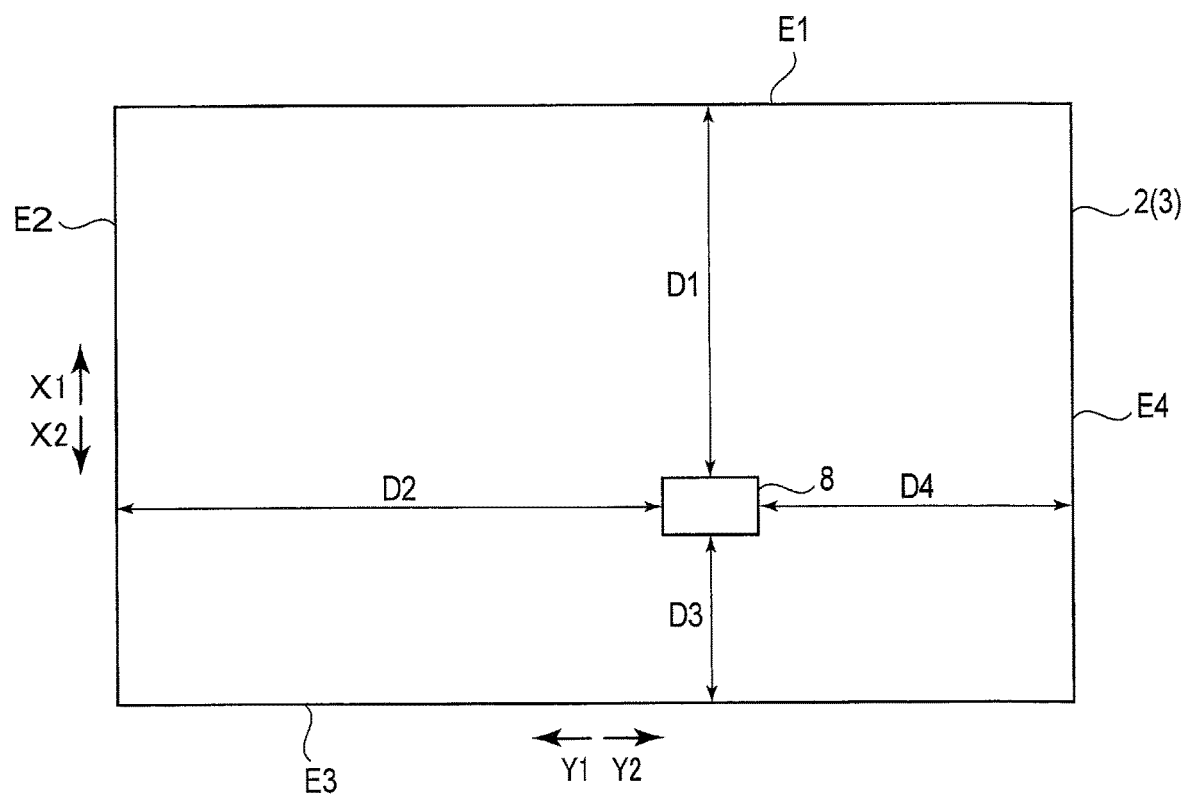
FIG. 5A is a schematic diagram showing bonding target members overlapped in a height direction as viewed from one side of the height direction in the ultrasonic bonding apparatus according to the embodiment.
Figure 5B:
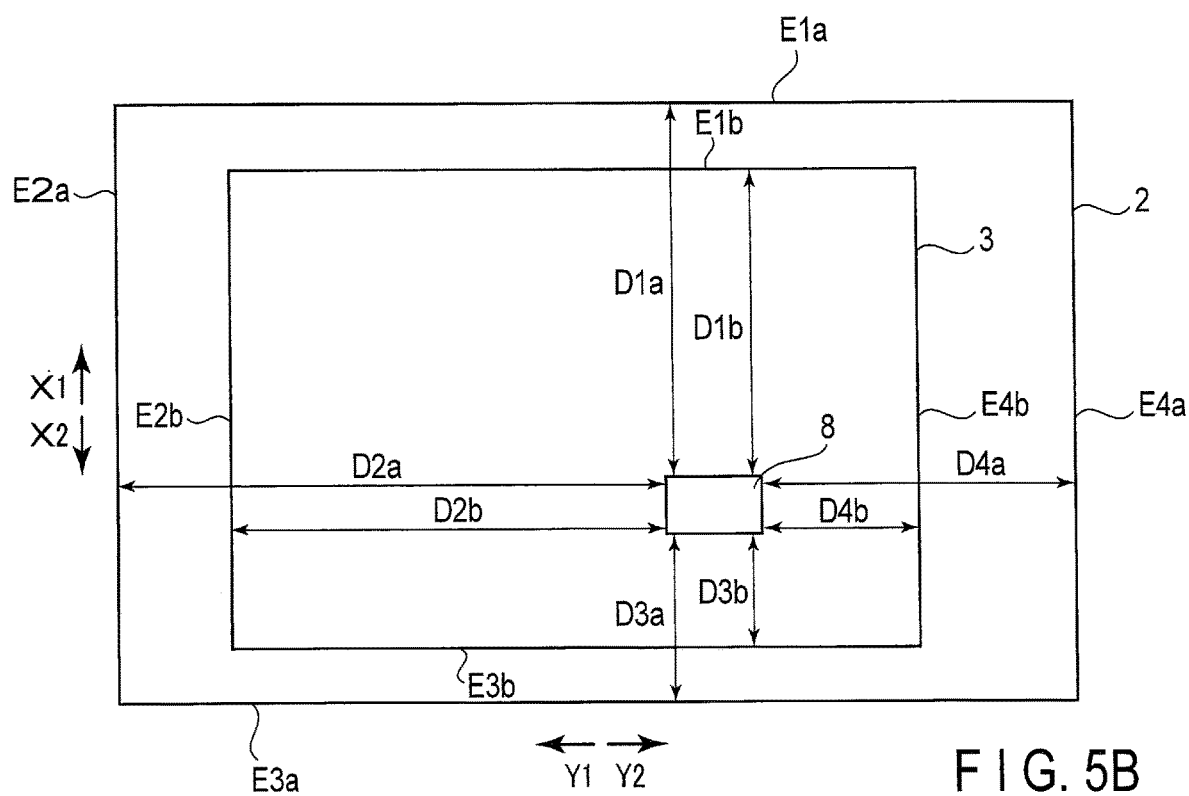
FIG. 5B is a schematic diagram showing bonding target members overlapped in the height direction in a state different from that in FIG. 5A, as viewed from one side of the height direction in the ultrasonic bonding apparatus according to the embodiment.

The temperature measurement range S (S1 and S2) is set based on a distance D between an edge portion of a main surface facing the height direction of each of the bonding target members 2 and 3 and the bonding tool 8 in a state where the bonding target members 2 and 3 are installed on the upper surface of the stage 4. In the present embodiment, an edge portion of a main surface is arranged between a pair of main surfaces set apart from each other in the height direction in each of the bonding target members 2 and 3. The temperature measurement range S (S1 and S2) is set so as to include an area in which the distance D between an edge portion and the bonding tool 8 is the shortest, among edge portions of the main surface of each of the bonding target members 2 and 3. This is because inclusion of an area where the distance from the bonding tool 8 is short in the temperature measurement range S (S1 and S2) renders it easier to measure the temperature in real time without delaying an actual temperature change of the bonding surface. Hereinafter, a specific setting method of a distance D will be mainly described with reference to FIGS. 5A to 5C, but is not limited thereto. In FIGS. 5A and 5B, the second direction is indicated by arrows Y1 and Y2.

FIG. 5A shows the first bonding target member 2 and the second bonding target member 3 as viewed from an upper side in the height direction. Herein, a dimension of the first bonding target member 2 and a dimension of the second bonding target member 3 are the same or approximately the same as each other. The first bonding target member 2 and the second bonding target member 3 overlap each other on the upper side of the stage 4 such that the edge portions of the main surface of the first bonding target member 2 and the corresponding edge portions of the main surface of the second bonding target member 3 coincide or approximately coincide with each other in the first and second directions. In the example of FIG. 5A, a position of an edge surface of the first bonding target member 2 and a position of a corresponding edge surface of the second bonding target member 3 coincide or approximately coincide with each other in the first direction or the second direction. That is, the edge surface of the first bonding target member 2 and the corresponding edge surface of the second bonding target member 3 are flush with each other.

In the example of FIG. 5A, in the bonding target members 2 and 3, edge portions E1 to E4 are defined, and distances D1 to D4 corresponding to the edge portions E1 to E4, respectively, are defined. That is, four edge portions and four distances are defined for the entire bonding target member including the bonding target members 2 and 3. In this case, a distance D1 is a distance in the first direction from a surface (a surface on an arrow X1 side) among the outer peripheral surfaces of the bonding tool 8 that is closest to the edge portion E1 to the edge portion E1. A distance D2 is a distance in the second direction from a surface (a surface on an arrow Y1 side) among the outer peripheral surfaces of the bonding tool 8 that is closest to the edge portion E2 to the edge portion E2. A distance D3 is a distance in the first direction from a surface (a surface on an arrow X2 side) among the outer peripheral surfaces of the bonding tool 8 that is closest to the edge portion E3 to the edge portion E3. A distance D4 is a distance in the second direction from a surface (a surface on an arrow Y2 side) among the outer peripheral surfaces of the bonding tool 8 that is closest to the edge portion E4 to the edge portion E4. As shown in FIG. 5A, a relationship among the magnitudes of the distances D1 to D4 is D1>D2>D4>D3. Thus, an area in which the temperature measurement range S (S1 and S2) is set is an area including the edge portion E3 corresponding to the distance. D3. Accordingly, in the example of FIG. 5A, the temperature measurement range S (S1 and S2) is set in the area including the edge portion E3. The temperature sensor 11 measures a temperature near the bonding surface of the bonding target members 2 and 3 within the temperature measurement range S (S1 and S2) including the edge portion E3.

As shown in FIG. 5B, in a state where the first bonding target member 2 and the second bonding target member 3 are overlapped in the height direction, the edge portions of the first bonding target member 2 and the corresponding edge portions of the second bonding target member 3 may be displaced from each other in the first direction and/or the second direction. That is, the edge surface of the first bonding target member 2 and the corresponding edge surface of the second bonding target member 3 are not flush in the first direction and/or the second direction. In the example of FIG. 5B, the first bonding target member 2 and the second bonding target member 3 are shown as viewed from the upper side in the height direction. In this example, four edge portions E1a to E4a of the main surface of the first bonding target member 2 and four edge portions E1b to E4b of the main surface of the second bonding target member 3 are defined. In addition, distances D1a to D4a and D1b to D4b corresponding to the edge portions E1a to E4a and E1b to E4b, respectively, are defined.

Similarly to the example of FIG. 5A, also in the example of FIG. 5B, the distance D1a is a distance in the first direction from a surface (a surface on the arrow X1 side) among the outer peripheral surfaces of the bonding tool 8 that is closest to the edge portion E1a to the edge portion E1a. A distance D1b is a distance in the first direction from a surface (a surface on an arrow X1 side) among the outer peripheral surfaces of the bonding tool 8 that is closest to the edge portion E1b to the edge portion E1b. Similarly to D1a and D1b, the distances D2a to D4a and D2b to D4b each is a distance in the first direction or the second direction from a bonding tool surface that is closest to an edge portion corresponding to each distance to the edge portion. As shown in FIG. 5B, among the distances D1a to D4a and D1b to D4b, the distance D3b is the shortest. Thus, an area in which the temperature measurement range S (S1 and S2) is set is an area including the edge portion E3b corresponding to the distance D3b. In the example of FIG. 5B, the edge portion E3a of the first bonding target member 2 and the edge portion E3b of the second bonding target member 3 are displaced from each other in the first direction. Then, in the example of FIG. 5B, the temperature measurement range S (S1 and S2) is set over both the edge portion E3a of the first bonding target member 2 and the edge portion E3b of the second bonding target member 3. The temperature sensor 11 measures a temperature near the bonding surface of the bonding target members 2 and 3 within the temperature measurement range S (S1 and S2) of the edge portions E3a and E3b.

As shown in FIG. 5C, the thickness of the first bonding target member 2 and the thickness of the second bonding target member 3 may change toward the outside of the first bonding target member 2 and the second bonding target member 3 (as closer to the edge portions). In the example of FIG. 5C, a thickness of the edge portion Ea of the first bonding target member 2 and a thickness of the edge portion Eb of the second bonding target member 3 become thinner toward one side (the arrow X1 side) of the first direction. In this case, the distance D is defined based on, at a portion (contact portion) in contact with the bonding tool 8, a total thickness (a total thickness of the contact portion) Tall of both a thickness of the second bonding target member 3 and a thickness of the first bonding target member 2 at the corresponding portion. Then, the distance D is a distance between a position where a total thickness of both the thickness of the edge portion Ea and the thickness of the edge portion Eb coincides or approximately coincides with the total thickness Tall in the first direction and a surface (a surface on the arrow X1 side) among the outer peripheral surfaces of the bonding tool 8 closest to the position. An area in which the temperature measurement range S (S1 and S2) is set is an area including the edge portion Ea of the first bonding target member 2 and the edge portion Eb of the second bonding target member 3, which is an area where the distance D is the shortest. Accordingly, in the example of FIG. 5C, the temperature measurement range S (S1 and S2) is set over the edge portions Ea and Eb. The temperature sensor 11 measures a temperature near the bonding surface of the bonding target members 2 and 3 within the temperature measurement range S (S1 and S2) including the edge portions E3a and E3b. A total thickness of a contact portion of the bonding tool 8 may be defined as a thickness obtained by averaging a plurality of total thicknesses of the bonding target members 2 and 3 in the vicinity of the contact portion.

In a case where three or more bonding target members are arranged in the height direction, a distance D is defined by setting two bonding target members adjacently arranged in the height direction and forming a bonding surface therebetween as a first bonding target member and a second bonding target member, respectively. In this case, the temperature measurement range S (S1 and S2) is set to an area including an edge portion of the first bonding target member 2 and an edge portion of the second bonding target member 3 in the manner described above.

In addition, in a case where a bonding target member is disk-shaped or approximately disk-shaped, an edge portion of a main surface of the bonding target member is not defined as in FIGS. 5A and 5B. That is, respective boundaries of a plurality of edge portions cannot be defined based on the shape of the bonding target member. In this case, a plurality of edge portions are arranged between a pair of main surfaces in the height direction and set to positions away from each other in the first direction and the second direction. Distances respectively corresponding to the edge portions are defined corresponding to the number of the edge portions set. A distance corresponding to an edge portion is, in the same manner as described above, a distance between the edge portion itself and the surface among the outer peripheral surfaces of the bonding tool 8 closest to it. Similarly to the cases of FIGS. 5A to 5C, the temperature measurement range S (S1 and S2) is set based on this distance.

Figure 6A:
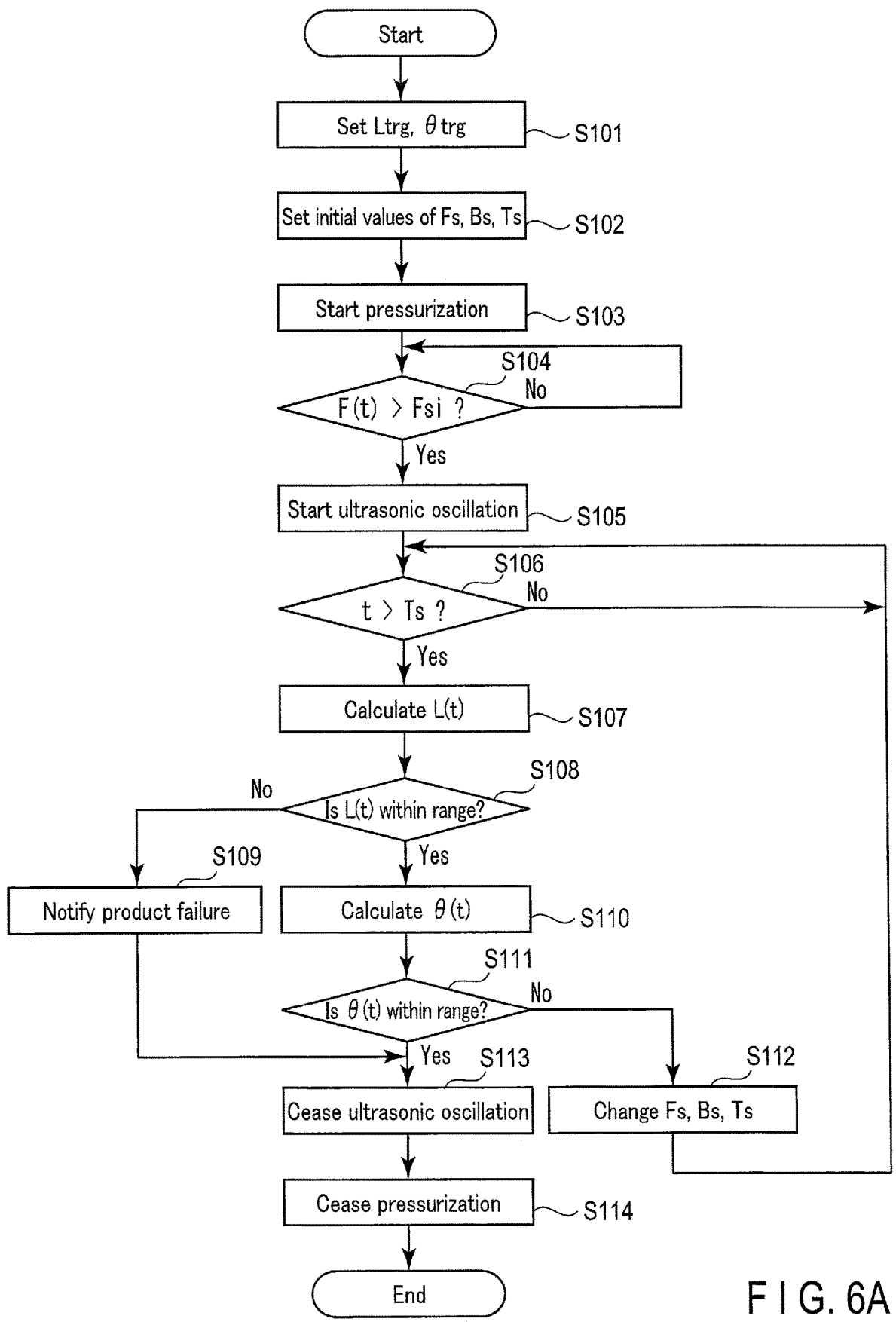
FIG. 6A is a flowchart showing an example of processing of a time control mode performed by a control device in the ultrasonic bonding apparatus according to the embodiment.

FIG. 6A shows an example of processing performed by a control device in a case of ultrasonically bonding the bonding target members in the ultrasonic bonding apparatus 1 of the embodiment. The processing in FIG. 6A is performed by the control device 30 every time an ultrasonic bonding work of the bonding target members 2 and 3 is performed in the ultrasonic bonding apparatus 1. Accordingly, the processing in FIG. 6A shows processing performed in single ultrasonic bonding of the control device 30. As shown in FIG. 2, in the present embodiment, the processing in FIG. 6A is performed by the central processor 31 of the control device 30. In the following descriptions, time t is defined as a variable of time. Then, pressurizing force F(t) at time t, ultrasonic vibration amplitude B(t) in the second direction, a position L(t) of the bonding target members 2 and 3, and a temperature θ(t) of the bonding target members 2 and 3, are defined. In addition, in the ultrasonic bonding apparatus 1, the pressurizing force F(t) and the position L(t) are periodically detected by the sensor 10, and the temperature θ(t) is periodically detected by the temperature sensor 11. In the central processor 31, the pressurizing force F(t), amplitude B(t), position L(t), and temperature θ(t) are periodically acquired. A time interval for detecting the pressurizing force F(t) is preferably from 0.05 milliseconds to 10 seconds. A time interval for detecting the amplitude B(t) is preferably from 0.05 milliseconds to 10 seconds. A time interval for detecting the position L(t) is preferably from 0.05 milliseconds to 10 seconds. A time interval for detecting the temperature θ(t) is preferably from 0.05 milliseconds to 10 seconds. Preferable ranges thereof are calculated based on a frequency of an ultrasonic wave used in the ultrasonic bonding apparatus 1 in one example. In another example, preferable ranges thereof are determined based on a combination of the bonding target members 2 and 3 used in the ultrasonic bonding apparatus 1, etc.

Hereinafter, a description will be given of a case where the central processor 31 adjusts oscillation of the ultrasonic oscillator 5 in cooperation with the ultrasonic oscillation controller 33, and the central processor 31 adjusts pressurization of the pressurization mechanism 9 in cooperation with the pressure controller 32. For example, the ultrasonic oscillator 5 is controlled by the ultrasonic oscillation controller 33 based on a control instruction input from the central processor 31. The pressurization mechanism 9 is controlled by the pressure controller 32 based on a control instruction input from the central processor 31.

In the ultrasonic bonding apparatus 1, the bonding target members 2 and 3 are installed on the upper surface of the stage 4 in the height direction. The bonding target members 2 and 3 overlap each other in the height direction. In addition, the bonding tool 8 is located above the bonding target members 2 and 3 in the height direction. As shown in FIG. 6A, in the central processor 31, a reference range Ltrg of a position of the bonding tool 8 in the height direction, and a reference range θtrg of a temperature of the bonding target members 2 and 3 are, for example, set based on an instruction input via the host device 35 shown in FIG. 2 (S101). In one example, an instruction may be input to the central processor 31 via a user interface provided in the host device 35. The reference range Ltrg of the bonding target members 2 and 3 is, for example, set corresponding to a range of a planned design value of a total thickness of the bonding target members 2 and 3 after ultrasonic bonding. An upper limit value of the reference range Ltrg is, for example, a design upper limit value of the total thickness of the bonding target members 2 and 3 after ultrasonic bonding. A lower limit value of the reference range Ltrg is, for example, a design lower limit value of the total thickness of the bonding target members 2 and 3 after ultrasonic bonding. In addition, the temperature reference range θtrg of the bonding target members 2 and 3 is set based on a condition under which the bonding target members 2 and 3 are bonded with high strength, etc. An upper limit value of the reference range θtrg is, for example, set based on a condition for ultrasonic bonding under which the bonding target members 2 and 3 are destroyed by ultrasonic bonding of the bonding target members 2 and 3, etc. A lower limit value of the reference range θtrg is, for example, set based on a condition for ultrasonic bonding under which the bonding strength of the bonding target members 2 and 3 is low and the bonding target members 2 and 3 break at the bonding surface, etc.

The central processor 31 sets an initial value Fsi of a target value (control target value) Fs of pressurizing force, an initial value Bsi of a target value (control target value) Bs of ultrasonic vibration amplitude in the second direction, and an initial value Tsi of a target value (control target value) Ts of a time for oscillating ultrasonic waves (S102). Pressurizing force for which the target value Fs is set, ultrasonic vibration amplitude in the second direction for which the target value Bs is set, and an oscillating time for which the target value Ts is set are control parameters associated with driving of the bonding tool 8. The central processor 31 adjusts oscillation of the ultrasonic oscillator 5 in cooperation with the ultrasonic oscillation controller 33 such that the ultrasonic vibration amplitude B(t) in the second direction coincides or approximately coincides with the amplitude target value Bs. Further, the central processor 31 adjusts pressurization of the pressurization mechanism 9 in cooperation with the pressure controller 32 such that the pressurizing force F(t) coincides or approximately coincides with the pressurizing force target value Fs. In one example, the initial value Fsi of the pressurizing force target value Fs is from 10 N to 4000 N, the initial value Bsi of the amplitude target value Bs is from 0.1 μm to 100 μm, and the initial value Tsi of the time target value Ts is from 0.05 milliseconds to 10 seconds. The initial value Fsi of Fs, the initial value Bsi of Bs, and the initial value Tsi of Ts are not limited thereto. The initial values Fsi, Bsi, and Tsi may be set based on the ultrasonic bonding apparatus 1 and a combination of the bonding target members 2 and 3, etc. In addition, the initial value Tsi may be, for example, calculated based on a frequency of an ultrasonic wave used in the ultrasonic bonding apparatus 1.

After settings of the reference ranges Ltrg and θtrg of the bonding target members 2 and 3 and the target values Fs, Bs, and Ts of the control parameters are completed, the bonding tool 8 descends in the height direction and comes into contact with the bonding target members 2 and 3. The central processor 31 controls the pressure controller 32 to start pressurization of the bonding target members 2 and 3 by the pressurization mechanism 9 (S103). When the pressurization mechanism 9 pressurizes the bonding target members 2 and 3, the pressurizing force F(t) fluctuates. As shown in FIG. 6A, the central processor 31 compares the pressurizing force F(t) with the initial value Fsi of the pressurizing force target value Fs (S104). If the pressurizing force F(t) is the initial value Fsi of the pressurizing force target value Fs or less (S104—No), the process returns to S104, and the processes in S104 and subsequent steps are sequentially performed. If the pressurizing force F(t) is greater than the initial value Fsi of the target value Fs (S104—Yes), the central processor 31 starts oscillation of ultrasonic waves from the ultrasonic oscillator 5 to the bonding target members 2 and 3 in cooperation with the ultrasonic oscillation controller 33 (S105).

When the ultrasonic oscillator 5 oscillates ultrasonic waves, the position L(t) of the bonding tool 8 in the height direction and the temperature θ(t) of the bonding target members 2 and 3 fluctuate. As shown in FIG. 6A, the central processor 31 compares the time t and the time target value Ts (S106). If the time t is the time target value Ts or less (S106—No), the process returns to S106, and the processes in S106 and subsequent steps are sequentially performed. If the time t is longer than the time target value Ts (S106—Yes), the central processor 31 calculates the position L(t) of the bonding tool 8 in the height direction based on a measurement value of the sensor (S107). The central processor 31 compares the position L(t) of the bonding tool 8 in the height direction and the position reference range Ltrg (S108). If the position L(t) falls outside the position reference range Ltrg (S108—No), the central processor 31, for example, causes the user interface provided in the host device 35 to notify product failure (S109). Then, the central processor 31 ceases ultrasonic oscillation from the ultrasonic oscillator 5 in cooperation with the ultrasonic oscillation controller 33 (S113). The central processor 31 ceases pressurization of the bonding target members 2 and 3 by the pressurization mechanism 9 in cooperation with the pressure controller 32 (S114). That is, if the position L(t) falls outside the position reference range Ltrg, the ultrasonic bonding apparatus 1 is stopped, and the driving of the bonding tool 8 is ceased accordingly. Then, ultrasonic bonding of the bonding target members 2 and 3 by the ultrasonic bonding apparatus 1 is terminated.

If the position L(t) of the bonding tool 8 in the height direction is within the position reference range Ltrg (S108—Yes), the central processor 31 compares the temperature θ(t) of the bonding target members 2 and 3 and the temperature reference range θtrg (S111). If the temperature θ(t) of the bonding target members 2 and 3 falls outside the temperature reference range θtrg (S111—No), the central processor 31 changes at least one of the target values Fs, Bs, and Ts (S112). For example, the central processor 31 changes a value of the target value Fs. As described above, the central processor 31 adjusts oscillation of the ultrasonic oscillator 5 in cooperation with the ultrasonic oscillation controller 33 such that the pressurizing force F(t) coincides or approximately coincides with the target value Fs. Thus, when the target value Fs is changed, a value of the pressurizing force F(t) is changed. The case where Fs is changed is identical to that where Bs and Ts are changed. A degree of change for each of the target values Fs, Bs, and Ts is appropriately set according to a combination of the bonding target members 2 and 3, etc. After the process in S112, the process returns to S106, and the processes in S106 and subsequent steps are sequentially performed.

If the temperature θ(t) of the bonding target members 2 and 3 is within the temperature reference range θtrg (S111—Yes), the central processor 31 ceases ultrasonic oscillation from the ultrasonic oscillator 5 in cooperation with the ultrasonic oscillation controller 33 (S113). The central processor 31 controls the pressure controller 32 to cease pressurization of the bonding target members 2 and 3 by the pressurization mechanism 9 (S114). That is, the driving of the bonding tool 8 is ceased. Thereby, ultrasonic bonding of the bonding target members 2 and 3 by the ultrasonic bonding apparatus 1 is completed.

Further, in the ultrasonic bonding apparatus 1, in addition to a time control mode for performing control based on the position L(t) of the bonding tool 8 in the height direction and the temperature θ(t) of the bonding target members 2 and 3 after performing control based on the time t when ultrasonic oscillation is started, a position control mode may also be provided. In the position control mode, when ultrasonic oscillation is started, the central processor 31 performs control based on the time t and the temperature θ(t) of the bonding target members 2 and 3 after performing control based on the position L(t) of the bonding tool 8. The time control mode and the position control mode can be switched between each other.

Figure 6B:
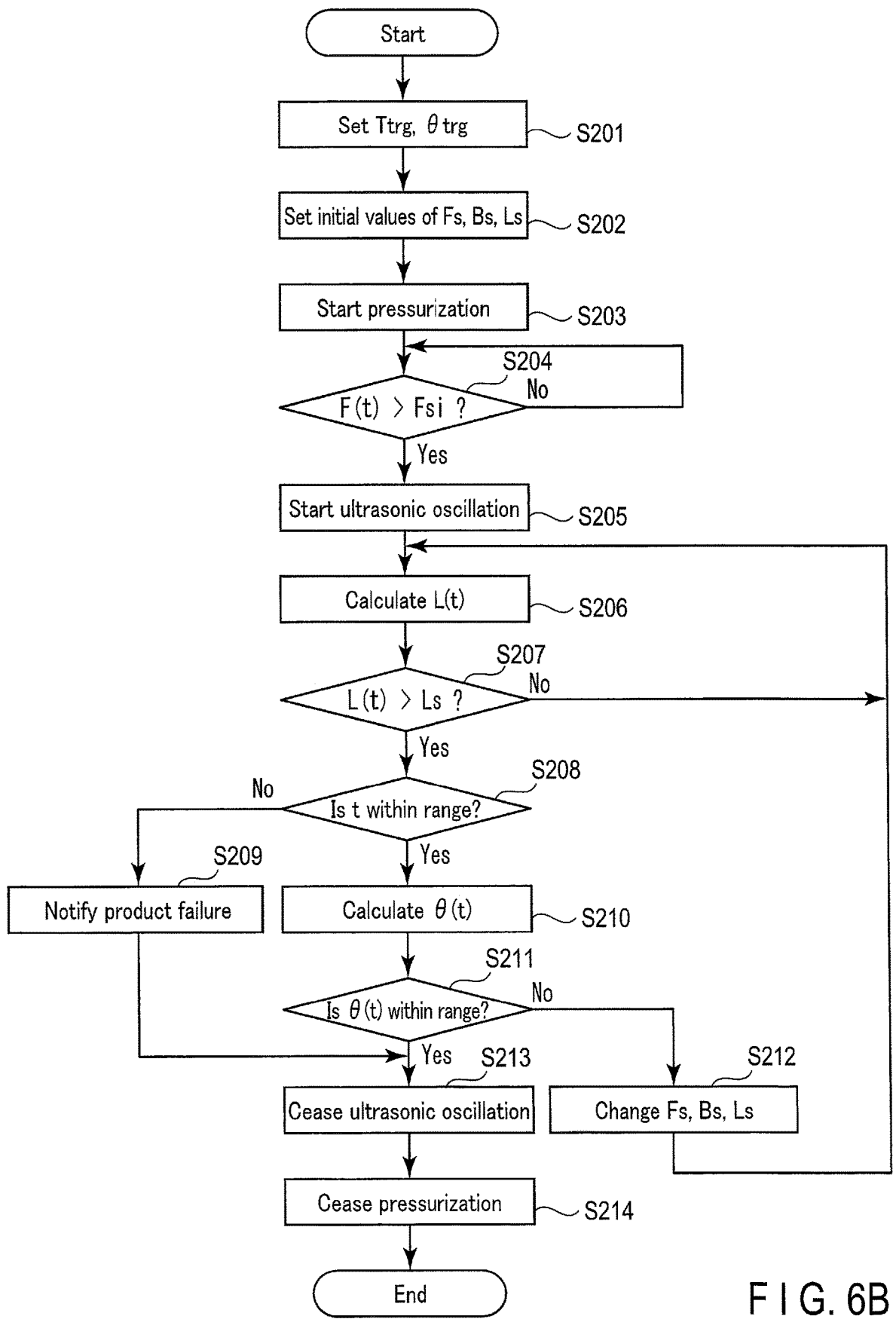
FIG. 6B is a flowchart showing an example of processing of a position control mode performed by the control device in the ultrasonic bonding apparatus according to the embodiment.

FIG. 6B shows an example of processing performed by the control device 30 in the position control mode. Processes in S201 to S205 are the same as the processes in S101 to S105 of the time control mode shown in the example of FIG. 6A. However, in the process in S201, instead of the temperature reference range (control reference range) Ltrg of the bonding target members 2 and 3, the time reference range (control reference range) Ttrg is set. The time reference range Ttrg is, for example, from 0.05 milliseconds to 10 seconds. This range is calculated based on a frequency of an ultrasonic wave used in the ultrasonic bonding apparatus 1 in one example. In another example, this range is determined based on a combination of the bonding target members 2 and 3 used in the ultrasonic bonding apparatus 1, etc. In addition, in the process in S202, instead of the initial value Tsi of the time target value Ts, the initial value Lsi of the position target value Ls of the bonding tool 8 is set. That is, pressurizing force for which the target value Fs is set, ultrasonic vibration amplitude in the second direction for which the target value Bs is set, and a position for which the target value Ls is set are control parameters associated with the driving of the bonding tool 8. The initial value Lsi of the position target value Ls is, for example, set within a range in which the thickness of the second bonding target member is from 10% to 90%. The time reference range Ttrg is, for example, set based on the bonding strength of the bonding target members 2 and 3. An upper limit value and/or a lower limit value of the reference range Ttrg are, for example, set based on a condition for ultrasonic bonding in a case where the bonding strength of the bonding target members 2 and 3 is insufficient, etc.

In the position control mode, when the ultrasonic oscillator 5 oscillates ultrasonic waves in S205, the central processor 31 calculates the position L(t) of the bonding tool 8 in the height direction based on a measurement value of the sensor 10 (S206). The central processor 31 compares the position. L(t) of the bonding tool 8 in the height direction and the position target value Ls (S207). If the position L(t) of the bonding tool 8 in the height direction is the position target value Ls or less (S207—No), the process returns to S206, and the processes in S206 and subsequent steps are sequentially performed. If the position L(t) of the bonding tool 8 in the height direction is greater than the position target value Ls (S207—Yes), the central processor 31 compares the time t and the time reference range Ttrg (S208).

If the time t falls outside the time reference range Ttrg (S208—No), the central processor 31 performs, in S209, S213, and S214, processes similar to the processes in S109, S113, and S114 in FIG. 6A. That is, if the time t falls outside the time reference range Ttrg, the ultrasonic bonding apparatus 1 is stopped, and the driving of the bonding tool 8 is ceased accordingly. Then, ultrasonic bonding of the bonding target members 2 and 3 by the ultrasonic bonding apparatus 1 is terminated. If the time t is within the time reference range Ttrg (S208—Yes), the central processor 31 performs, in S211 to S214, processes similar to the processes in S111 to S114 in FIG. 6A. However, in S212, instead of at least one value of the target values Fs, Bs, and Ts, at least one value of the target values Fs, Bs, and Ls is changed. Thereby, ultrasonic bonding of the bonding target members 2 and 3 by the ultrasonic bonding apparatus 1 is completed.

In the ultrasonic bonding apparatus 1 according to the present embodiment, the temperature sensor 11 detects a temperature of the bonding target members 2 and 3 which vibrate by ultrasonic vibration. The control device 30 changes control parameters based on information related to the temperature of the bonding target members 2 and 3 detected by the temperature sensor 11. Thereby, even when the temperature of the bonding target members 2 and 3 falls outside a reference range, in the ultrasonic bonding apparatus 1, the control device 30 can change the control parameters appropriately. Thus, in the ultrasonic bonding apparatus 1, a decrease in the bonding strength of the bonding target members 2 and 3 in ultrasonic bonding is suppressed. That is, the bonding strength of the bonding target members 2 and 3 is maintained.

In the ultrasonic bonding apparatus 1 of the present embodiment, a temperature of a bonding target member is measured at an edge portion of a main surface facing the height direction of each of a plurality of bonding target members. Thereby, it is possible to measure a temperature of a position close to a surface where the bonding target members 2 and 3 are ultrasonically bonded. Thus, the temperature sensor 11 can measure the temperature without delaying a temperature change in ultrasonic bonding of the bonding target members 2 and 3. Accordingly, the control device 30 can acquire information related to the temperature of the bonding target members 2 and 3 in real time, and change control parameters more appropriately. Thus, in the ultrasonic bonding apparatus 1, a decrease in the bonding strength of the bonding target members 2 and 3 in ultrasonic bonding is further suppressed. That is, the bonding strength of the bonding target members 2 and 3 is further maintained.

In the ultrasonic bonding apparatus 1 of the present embodiment, the bonding target members include a first bonding target member and a second bonding target member. The second bonding target member is arranged adjacent to the first bonding target member in the height direction, and forms a bonding surface with the first bonding target member. A temperature measurement range by a temperature sensor includes an area in which a distance between an edge portion and a bonding tool is the shortest among edge portions of a main surface of the first bonding target member and edge portions of a main surface of the second bonding target member. Thereby, a temperature change in ultrasonic bonding of the bonding target members 2 and 3 can be measured with higher sensitivity. Accordingly, the control device 30 can change control parameters more appropriately. Therefore, in the ultrasonic bonding apparatus 1, a decrease in the bonding strength of the bonding target members 2 and 3 in ultrasonic bonding is further suppressed. That is, the bonding strength of the bonding target members 2 and 3 is further maintained.

In the ultrasonic bonding apparatus 1 of the present embodiment, the control parameters include at least one selected from the target value Fs of pressurizing force, the target value Bs of ultrasonic vibration amplitude in the second direction, the target value. Ts of a time for oscillating ultrasonic vibration, and the target value Ls of a position of the bonding tool 8 in the height direction. If a surface temperature of the bonding target members 2 and 3 falls outside the reference range θtrg, the control device 30 changes at least one of the control parameters. Thereby, even when the temperature of the bonding target members 2 and 3 falls outside the reference range, the control device 30 changes the control parameters more appropriately in the ultrasonic bonding apparatus 1. Therefore, in the ultrasonic bonding apparatus 1, a decrease in the bonding strength of the bonding target members 2 and 3 in ultrasonic bonding is further suppressed. That is, the bonding strength of the bonding target members 2 and 3 is further maintained.

In at least one of these embodiments, an ultrasonic bonding apparatus includes a temperature sensor that detects a temperature of a bonding target member arranged on an upper side of a stage. The ultrasonic bonding apparatus includes a control device that changes a control parameter associated with the driving of a bonding tool based on information related to the temperature detected by the temperature sensor. Thereby, in the ultrasonic bonding apparatus, a decrease in the bonding strength of the bonding target member can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic bonding apparatus comprising:
    a stage where a plurality of bonding target members are arranged on an upper side in a height direction, each of the bonding target members including a main surface and an edge portion, the bonding target members overlapping each other in the height direction, the bonding target members being arranged in a state that the main surface of each of the bonding target members faces the height direction and the edge portion of each of the bonding target members faces a direction intersecting the height direction;
    a bonding tool arranged above the bonding target members in the height direction, and configured to bond the bonding target members by being driven in a state of using pressurizing force to press the bonding target members downward in the height direction and transmitting ultrasonic vibration, which vibrates in the direction intersecting the height direction, to the bonding target members;
    a temperature sensor configured to detect a temperature in the edge portions of the bonding target members when the ultrasonic vibration is transmitted to the bonding target members; and
    a control device configured to change a control parameter associated with driving of the bonding tool based on information related to the temperature in the edge portions of the bonding target members detected by the temperature sensor.

2. The ultrasonic bonding apparatus according to claim 1, wherein
    the bonding target members include a first bonding target member, and a second bonding target member arranged adjacent to the first bonding target member in the height direction and forming a bonding surface with the first bonding target member, and
    a measurement range of the temperature by the temperature sensor includes an area in which, among the edge portion of the first bonding target member and the edge portion of the second bonding target member, a distance between the edge portions and the bonding tool is the shortest.

3. The ultrasonic bonding apparatus according to claim 1, wherein the temperature sensor is a contact temperature sensor or a noncontact temperature sensor.

4. The ultrasonic bonding apparatus according to claim 1, wherein
    information related to the temperature includes a surface temperature in the edge portions of the bonding target members,
    the control parameter includes at least one selected from a target value of the pressurizing force, a target value of amplitude of the ultrasonic vibration, a target value of a time for oscillating the ultrasonic vibration, and a target value of a position of the bonding tool in the height direction, and
    the control device changes at least one of the control parameters when the surface temperature falls outside a reference range of the temperature.

\* \* \* \* \*